March 25, 1930.  G. B. BRIGHT  1,751,617
ICE HARVESTING DEVICE
Filed July 15, 1929  2 Sheets-Sheet 1
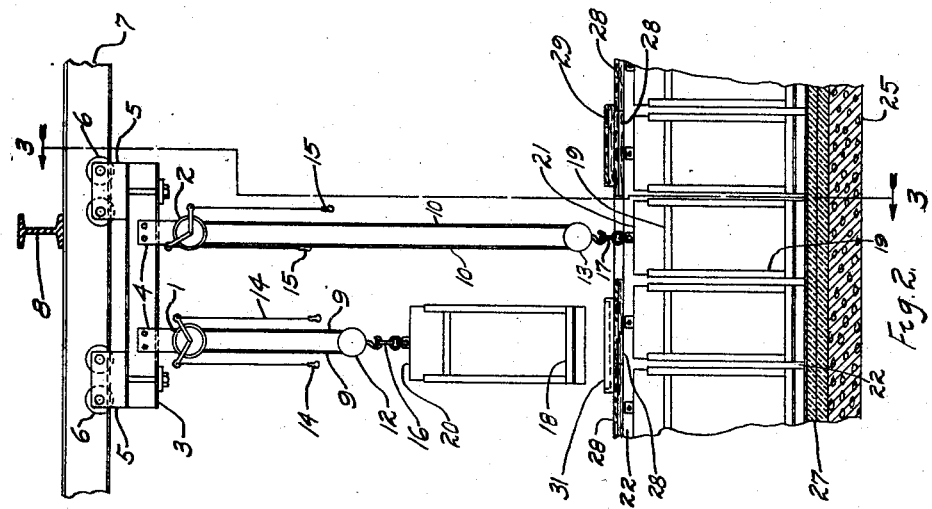
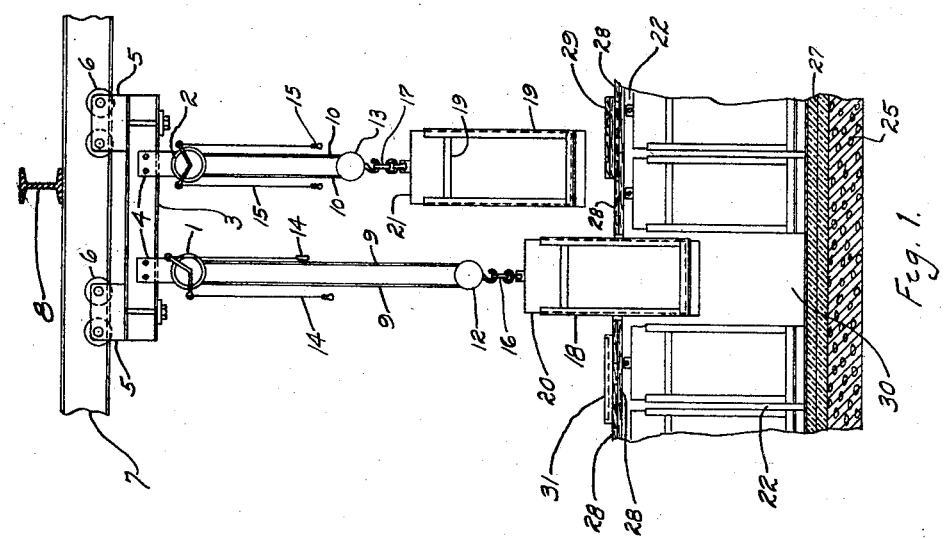
INVENTOR.
George B. Bright,
BY
George B. Ingersoll.
ATTORNEY.

March 25, 1930.　　　　　G. B. BRIGHT　　　　　1,751,617
ICE HARVESTING DEVICE
Filed July 15, 1929　　　2 Sheets-Sheet 2

INVENTOR.
George B. Bright,
BY George B. Ingersoll.
ATTORNEY.

Patented Mar. 25, 1930

1,751,617

UNITED STATES PATENT OFFICE

GEORGE B. BRIGHT, OF DETROIT, MICHIGAN

ICE-HARVESTING DEVICE

Application filed July 15, 1929. Serial No. 378,491.

My invention relates to improvements in harvesting devices in ice plants in which freezing tanks are operated in conjunction with harvesting equipment; and the objects of my improvements are, first, to provide an ice harvesting device having a plurality of individual hoisting mechanisms; second, to provide an ice harvesting device having spaced hoisting mechanisms operating over spaced freezing compartments; third, to provide means for suspending a freezing unit while raising or lowering another freezing unit into its freezing compartment; fourth, to provide a harvesting device mounted upon a single movably mounted member; fifth, to provide a harvesting device that reduces the length of time during which the freezing of each individual ice basket or group of ice cans, is interrupted; sixth, to provide means for removing and replacing freezing units without varying the efficiency of the freezing medium; and seventh, to provide a double hoisting device operating as a single movable unit on a monorail, or crane.

I attain these objects by the mechanism illustrated in the accompanying drawings, in which,—

Figure 3:
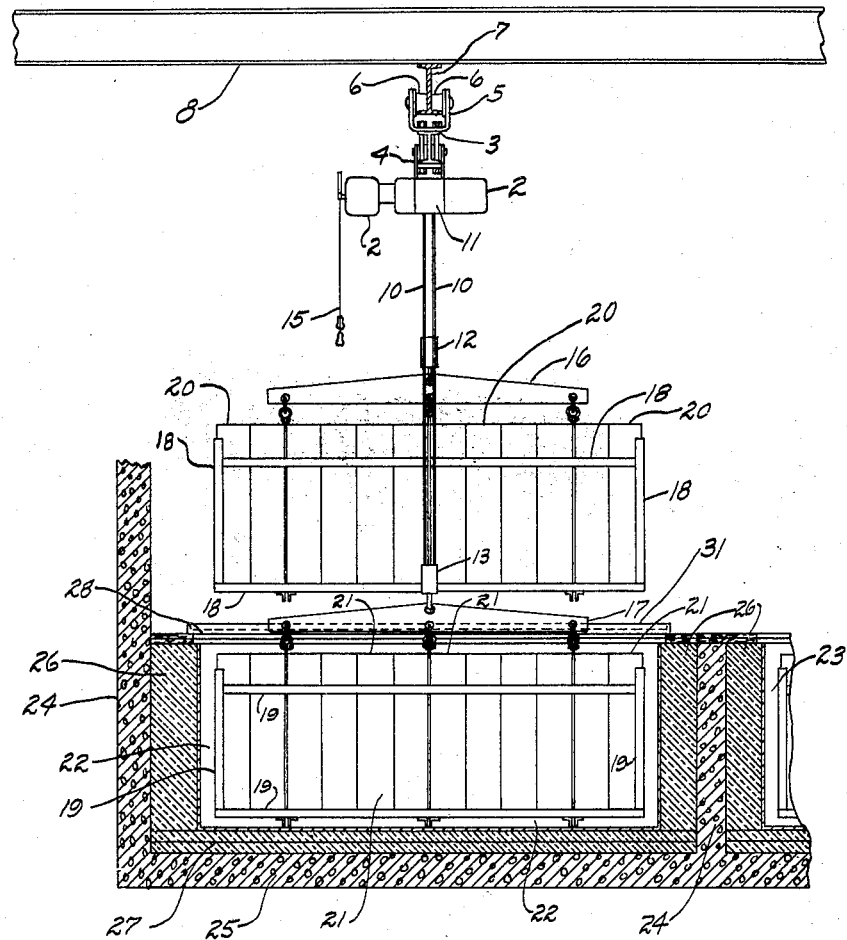
Figure 4:
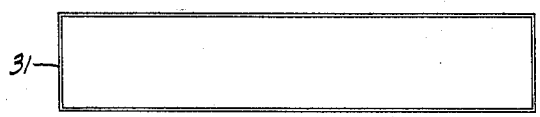
Figure 5:

Fig. 1 is a side elevation of the harvesting device removing a freezing unit from one of the freezing tanks of an ice plant; Fig. 2, a side elevation of the harvesting device replacing a freezing unit in one of the freezing tanks of an ice plant; Fig. 3, an end elevation of the harvesting device and freezing tanks of an ice plant on the line 3—3, Fig. 2; Fig. 4, a plan view of a drip pan for catching freezing brine clinging to freshly removed ice can group; and Fig. 5, a side view of a drip pan for freezing brine.

Similar numerals refer to similar objects throughout the several views.

Figure 1 discloses the hoist 1 and 2 attached to the common frame member 3 by the brackets 4. The frame member 3 is provided with the brackets 5 in which are rotatably mounted the rollers 6 which are operatively supported on the lower flanges of the monorail or crane beam 7. The monorail beam 7, of which only a fragmentary portion is shown, may be of any desired length and may be supported from the customary beams used in the construction of an ice plant, one of said beams 8 being shown. The chains or cables 9 and 10 connect the winding drums 11 of the hoists 1 and 2 with the pulley load blocks 12 and 13, the operation of the hoists 1 and 2 being governed by the controls 14 and 15. The pulley load blocks 12 and 13 are connected to equalizing bars 16 and 17 which are in turn suitably connected to the framework of the ice baskets 18 and 19 which support and contain the individual ice containers or cans 20 and 21.

The freezing tanks 22 and 23 of the ice plant contain the freezing brine and are so constructed as to allow for a plurality of ice baskets, together with their individual ice containers, to be immersed therein as shown in the several views.

The freezing tanks 22 and 23 are formed within the side walls 24 and the bottom wall 25, suitable insulation 26 and 27 being provided around said freezing tanks 22 and 23. The freezing tanks 22 and 23 are enclosed at their top by the customary type of covers 28 which are normally in place directly over each ice basket when immersed in the brine of the freezing tanks 22 and 23.

It is to be noted that the hoists 1 and 2 are permanently mounted at a fixed center to center spacing which is approximately the same as the center to center spacing of the covers 28 of the freezing tanks 22 and 23 and the individual load blocks 12 and 13 together with the cables or chains 9 and 10 and the winding drums 11 are so arranged that either of the hoists 1 or 2 may be used independent of the other, the entire group of both hoists and their equipment being capable of being moved along the monorail beam 7 as a single device.

In Fig. 1, the double monorail hoisting device is shown as having been returned to the desired location above the freezing tanks 22 and 23, with which it cooperates and serves, by delivering a suspended load of water in the individual containers or cans 21 in the ice basket 19 ready for freezing in the tank 22, this return travel of the monorail hoisting device having been preceded by the travel of said monorail hoisting device in handling the containers or cans 20 in the ice basket 18 together with their frozen ice contents in their removal to the customary thawing and dumping equipment positions (not shown), with but one of the hoists, namely 1, being employed for this harvesting movement. After this preceding or dumping cycle has been completed, the monorail hoisting device will be returned to the position as shown in Fig. 1, said monorail hoisting device now bearing its suspended load of fresh water in the containers or cans 21 for freezing.

Upon approaching the positions as shown in Fig. 1, where the ice in the ice baskets in the freezing tank 22 is ready for removal, the customary type of freezing tank cover 28 is removed from over an ice basket, said cover being shown in its removed position 29 from over the portion 30 of the freezing tank 22, and the unemployed hoist 1 is connected to the ice basket 18 containing the containers or cans 20 of ice ready for removal, said ice basket 18 being shown in Fig. 1, as having been partially removed from the portion 30 of the freezing tank 22.

In conjunction with the monorail hoisting device and ice baskets, a movable drip pan 31 is located on the opposite side of the ice basket, selected for removal from the freezing tank, away from the side of the approach of the monorail hoisting device. The drip pan 31 may be constructed, if desired, of galvanized metal and is larger in area than the ice basket and can assembly with which it is to be used.

After the ice basket 18 together with its containers or cans 20 of frozen ice has been raised by the hoist 1 to an elevated position clear of the freezing tank 22 and its equipment and after allowing the brine to drip momentarily from the ice basket 18 and its containers or cans 20 back into the uncovered portion 30 of the freezing tank 22, the double hoisting device is advanced a distance equal to the center to center distance of its pulley load blocks 12 and 13, thus placing the newly removed and slightly dripping ice basket 18 and its containers or cans 20 over the drip pan 31 as shown in Fig. 2. This advancing movement of the monorail hoisting device thus places the ice basket 19 and its containers or cans 21 of fresh water directly over the portion 30 of the freezing tank 22 and instantly allows the replacement of the basket 19 of fresh water into the portion 30 formerly occupied by the basket 18 of frozen ice which has just been removed.

This instant removal of the frozen ice supply and replacement by the fresh water supply is rendered possible by the center to center spacing of the pulley load blocks 12 and 13 being equal to the center to center distance of the covered portions 30 of the freezing tank 22. This arrangement permits the instant detachment of the water filled basket 19 and the return of the customary cover to its usual closing position over the basket 19 in the freezing tank 22, as shown in the Fig. 2, the cover 29 being shown still in its removed position. The double hoisting device is allowed to remain in the position as shown in Fig. 2 in which the ice basket 18 is directly over the drip pan 31, thus allowing the last remains of any brine which was clinging to the ice basket 18 together with its containers or cans 20 to fall into the drip pan 31, the double hoisting device also remaining in said position for such additional time as is necessary to thoroughly temper the frozen ice in the removed ice basket 18. From this point in the cycle of operation, the ice basket 18 suspended from the hoist 1 in Fig. 2 would be handled in the method as above described relative to its transfer again to the thawing and dumping equipment (not shown).

One of the important advantages gained by the use of my ice harvesting device is the maintenance of the same level of brine in the ice freezing tanks 22 and 23 at all times during the twenty four hours of the day, except the brief instant required for the removal of the basket containing the ice to be harvested, the advancement of the hoist through a distance equal to the center to center spacing of the freezing compartments in the freezing tanks, and the lowering of the basket containing the water to be frozen.

Although my double hoisting device is illustrated in connection with the monorail type of hoisting equipment, it is of equal or greater importance when used in connection with prevailing types of travelling cranes where an entire row of ice is harvested at one time, rather than a fractional part of a row, and in this way has a universal application to all types of ice harvesting equipment.

In common practice where an ice basket or multiple group of cans are removed from an ice freezing tank, the level of the cold brine surrounding the cans is commonly lowered from one to five or six inches in depth. It is quite common for a basket unit to be removed from the cold brine for a period of from ten to fifteen minutes for each removal and replacement cycle and might easily average, in many plants, fifty percent of the total time in this inefficient condition.

In freezing ice, the last portion to be frozen is known as the core and this portion is especially difficult to close up, and especially is this true of the portion of the core at the top of the block of ice, where it is approximately at the level of the brine surrounding the cans, and it has been proven conclusively that if it is possible to submerge the can in the cold brine bath for several inches below the top of the block of ice that it greatly hastens the time necessary for freezing. To have the level of the brine at or above the finished level of the frozen block of ice in the cans is of serious importance in hastening the removal time of the freezing process.

The final closure time required may be varied from twenty to twenty five per cent depending upon the level of the brine outside the can with respect to the final expanded height of the frozen ice inside of the can.

In addition to the effect of the level of the brine upon the freezing time of the water in the cans, is the loss of refrigeration due to the necessity or custom of allowing the tank to remain open and allowing the warm air of the tank room to contact directly with the cold surface of the exposed brine. With my ice harvesting device, the water to be frozen would be immediately placed in the freezing tank and covered, thus accomplishing a substantial economy of refrigeration.

In the use of my ice harvesting device, the brine dripping from the suspended group of cans would be collected upon the drip pan 31, said drip pan being equipped with suitable drain pipe means (not shown) for conducting the collected brine directly back into the freezing tank, thus accomplishing an economy in the use of calcium or salt necessary to be added from time to time for maintaining the proper strength of the brine for the required freezing purposes. This practice will thus also enable the user to maintain a dry tank top which will be decidedly better from the consideration of the insulation value of the tank top, will improve the sanitary appearance of the tank top, and will provide for an increase in the safety factors surrounding the workmen in the plant.

It is customary for ice tank tops or covers 29 and 31 in the usual or ordinary ice plant to be partially or wholly damp at all times, and both wet and slippery due to the continual uptake of moisture from the air by the calcium or salt which has dripped from the cans while en route to the dumping equipment (not shown). Increased safety to the operator will be possible due to the security of footing with drier tank tops and will be of no little importance to the user in reduction of insurance risks.

Use of this double hoisting device in sufficient quantities will allow a much longer tempering period than has customarily been the practice which will bring about a more gradual separation of the ice from the walls of the cans. This prolonged tempering period will nearly or wholly release the ice from the cans thus requiring a minimum time for the thawing operation and a minimum loss of ice customarily melted away in the thawing bath. It has been variously estimated that the ice required to be frozen and which is later lost in the thawing process will amount to from three to five per cent of the total quantity frozen, and thus the use of my ice harvesting device will accomplish a very substantial reduction in this direct loss.

It is to be further noted that with a symmetrical arrangement of hoists in the double lifting device that either pulley load block of the hoists may be engaged with the ice basket to be handled or that, during the thawing or dumping operation, the procedure may be optionally changed from one hoist to the other to facilitate the return and placement of the cans of water to be frozen, depending upon the arrangement of the ice plant.

In the case of ice plants using turn table devices, the entire double hoist apparatus may be reversed, at will, as to best meet the particular needs for handling purposes.

I claim:

1. In an ice freezing apparatus comprising spaced freezing portions, the combination of freezing units in each of said freezing portions, and means for supporting one of said freezing units over said freezing portions, said means being further adapted to remove another of said freezing units from one of said spaced freezing portions, said means being further supported as a movable unit above said spaced freezing portions of the ice freezing apparatus.

2. In an ice harvesting apparatus, the combination of a pair of spaced hoists, a member supporting said pair of spaced hoists, said member being movably supported, freezing compartments having spaced center to center distances approximately equal to said spaced hoists, freezing units in said freezing compartments, and means for attaching said spaced hoist to one or more of said freezing units.

3. In an ice harvesting apparatus, the combination of a plurality of freezing compartments, freezing units in said freezing compartments, and means for supporting one of said freezing units above said freezing tanks while said means is removing or replacing another of said freezing units in one of said freezing compartments, said means being movably supported above said freezing compartments.

4. In an ice harvesting apparatus, the combination of freezing compartments, freezing units in said freezing compartments, and means for transporting a freezing unit above said freezing compartments, said means being adapted to support the transported freezing unit above said freezing compartments while removing one of said freezing units from said freezing compartments, said means being further adapted to support the removed freezing unit above said freezing compartments while placing the transported freezing unit in one of said freezing compartments.

5. In an ice harvesting apparatus, the combination of means for freezing and movably mounted means for removing and replacing a portion of said means for freezing, said movably mounted means being further adapted to support the removed portion of said means for freezing while replacing another portion of said means for freezing.

6. In an ice freezing apparatus, the combination of a freezing tank, spaced freezing units in said tank, a monorail suitably supported above said freezing tank, means movably mounted on said monorail, said means being adapted to support one of said freezing units while removing another of said freezing units from said freezing tank, said means being further adapted to be advanced and to lower its first mentioned freezing tank in the space in said freezing tank formerly occupied by the removed freezing unit, and a drip collecting member under the freezing unit removed and supported by said means.

7. In an ice harvesting apparatus, the combination of a freezing tank, freezing units in said freezing tank, a monorail suitably supported above said freezing tank, means for removing a freezing unit from said freezing tank and moving the removed freezing unit above said freezing tank, and means for lowering another freezing unit into said freezing tank, said first mentioned means and said last mentioned means being movably supported as a unit on said monorail.

8. In an ice freezing and harvesting apparatus, the combination of a freezing tank, freezing units in said freezing tank, a monorail suitably supported above said freezing tank, and means for raising one of said freezing units from said freezing tank and means for lowering another freezing unit into the space formerly occupied by the removed freezing unit, said first mentioned means and said last mentioned means being movably supported as a unit on said monorail.

Dated June 3d, 1929, Dearborn, Mich.

GEORGE B. BRIGHT.